United States Patent
Son et al.

(10) Patent No.: US 11,981,022 B2
(45) Date of Patent: May 14, 2024

(54) TOOL CHANGER AND TOOL CHANGE SYSTEM INCLUDING THE SAME

(71) Applicant: LG ELECTRONICS INC., Seoul (KR)

(72) Inventors: Changwoo Son, Seoul (KR); Seyul Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1283 days.

(21) Appl. No.: 16/564,675

(22) Filed: Sep. 9, 2019

(65) Prior Publication Data
US 2021/0039266 A1     Feb. 11, 2021

(30) Foreign Application Priority Data

Aug. 7, 2019 (KR) .......................... 10-2019-0096007

(51) Int. Cl.
*B25J 15/04* (2006.01)

(52) U.S. Cl.
CPC ....... *B25J 15/0433* (2013.01); *B25J 15/0491* (2013.01)

(58) Field of Classification Search
CPC ................ B25J 15/0425; B25J 15/0433; B25J 15/0491; Y10S 483/901; Y10S 483/902
See application file for complete search history.

(56) References Cited

U.S. PATENT DOCUMENTS

| 4,944,459 | A | * | 7/1990 | Watanabe | ........... B05B 12/1472 403/14 |
| 6,645,131 | B2 | * | 11/2003 | Asp | ........................ B23Q 3/155 483/53 |
| 2014/0349824 | A1 | * | 11/2014 | Chen | ................... B23Q 3/15553 483/30 |

FOREIGN PATENT DOCUMENTS

| DE | 202018102683 U1 | * | 7/2018 | |
| ES | 2686107 T3 | * | 10/2018 | .......... B25J 15/0009 |
| GB | 2069908 A | * | 9/1981 | ............. B21D 37/04 |
| JP | H09321183 A | * | 12/1997 | |

* cited by examiner

*Primary Examiner* — Eric A. Gates
(74) *Attorney, Agent, or Firm* — Birch, Stewart, Kolasch & Birch, LLP

(57) ABSTRACT

A tool change system includes: a seating portion configured to have a tool seated thereon; a tool changer disposed on a manipulator to separate the tool from the seating portion; and a pressing portion disposed on an upper side of the seating portion to release the tool from the tool changer. The tool changer includes: a main body disposed on the manipulator; and a gripper connected to the main body and including a hook to be locked into a locking recess formed on the tool and a lever pressed by the pressing portion.

14 Claims, 15 Drawing Sheets

TOOL CHANGER AND TOOL CHANGE SYSTEM INCLUDING THE SAME

CROSS-REFERENCE TO RELATED APPLICATION

The present application claims priority under 35 U.S.C. 119 and 35 U.S.C. 365 to Korean Patent Application No. 10-2019-0096007, filed on Aug. 7, 2019, which is hereby incorporated by reference in its entirety.

BACKGROUND

The present disclosure relates to a tool changer for changing a tool, and a tool change system including the same.

Mechanical devices performing motions like human motions by using electrical or magnetic actions are generally referred to as robots. In recent years, robots are utilized in various fields with the enhancement of control technology, and for example, may include surgical robots, housekeeper robots, service robots, aerospace remote control robots, hazardous material processing robots, and the like. Such robots perform tasks by using a manipulator which is manufactured to perform motions similar to arm or hand gestures by an electrical or mechanical mechanism.

In particular, a housekeeper robot may fasten a specific tool to the manipulator to perform a specific task. For example, a cooking robot may fasten various tools such as a ladle, a spatula, a pot, or the like to the manipulator to perform cooking.

Accordingly, it is important for a tool changer provided on the manipulator to change a tool rapidly and exactly in order to enhance the task performing efficiency of a robot.

However, since a related-art tool changer uses a pneumatic system, additional equipment of a large scale structure may be required and there are problems that a cost increases and noise is generated.

SUMMARY

An object of the present disclosure is to provide a tool changer of a compact size capable of coupling/decoupling a tool rapidly and easily, and a tool change system including the same.

A tool changer according to an embodiment of the present disclosure may include: a main body disposed on a manipulator; a gripper connected to an outer circumference of the main body through a hinge shaft; and a spring configured to connect the main body and the gripper. The gripper may include: a lever having the spring connected thereto and pressed upward by a pressing portion; a first link configured to connect the lever and the hinge shaft; a second link extended downward from the first link; and a hook formed on the second link and facing a lower side of the main body with respect to a horizontal direction, and configured to be locked into a locking recess formed on a tool.

A tool changer according to an embodiment of the present disclosure may include: a main body disposed on a manipulator; a bracket disposed on an outer circumference of the main body; a lever pressed upward or downward by a pressing portion; a link configured to connect the bracket and the lever; a driving portion configured to connect the bracket and the lever and disposed on a lower side of the link; and a hook disposed on the driving portion and facing a lower side of the main body, and configured to be locked into a locking recess formed on a tool.

The driving portion may include: a connection portion having both ends connected to rotation shafts disposed on the bracket and the lever; an extension portion extended downward from the connection portion; and a fastening member fastened to a lower end of the extension portion and having the hook disposed on an end of an inside thereof.

The tool changer according to an embodiment of the present disclosure may further include a lower spring disposed on a bottom surface of the main body and compressed between the main body and the tool.

The tool changer according to an embodiment of the present disclosure may further include a switch disposed on a bottom surface of the main body and configured to apply a current when being pressed upward by the tool.

The tool changer according to an embodiment of the present disclosure may further include one pair of spring terminals disposed on a bottom surface of the main body and configured to apply a current when coming into contact with a conducting plate disposed on a top surface of the tool.

A tool change system according to an embodiment of the present disclosure may include: a seating portion configured to have a tool seated thereon; a tool changer disposed on a manipulator to separate the tool from the seating portion; and a pressing portion disposed on an upper side of the seating portion to release the tool from the tool changer. The tool changer may include: a main body disposed on the manipulator; and a gripper connected to the main body and including a hook to be locked into a locking recess formed on the tool and a lever pressed by the pressing portion.

The tool changer may further include a spring configured to connect the main body and the lever, and to provide an elastic force to allow the gripper to rotate in a direction of making the hook locked into the locking recess.

A plurality of the grippers may be provided to be spaced apart from one another in a circumferential direction, and a plurality of the pressing portions may be provided to be spaced apart from one another in the circumferential direction.

The tool changer may further include a lower spring disposed on a bottom surface of the main body and compressed between the main body and the tool.

The tool may include: a tool main body; and an adaptor fastened to an upper side of the tool main body and having the locking recess formed on an outer circumference thereof.

The tool may further include a conducting plate disposed on a top surface of the adaptor, and the tool changer may further include one pair of spring terminals disposed on a bottom surface of the main body and configured to apply a current when coming into contact with the conducting plate.

The tool changer may further include a switch disposed on a bottom surface of the main body and configured to apply a current when being pressed upward by the adaptor.

The seating portion may have an opening formed therein to allow the tool main body to pass therethrough.

The tool change system may further include a column portion protruding upward from the seating portion to be connected with the pressing portion.

The column portion may further include a guide surface which is inclined inward in a downward direction.

A guide protrusion may be formed on any one of a bottom surface of the adaptor and a top surface of the seating portion, and a guide recess may be formed on the other one to have the guide protrusion inserted thereinto.

A magnet may be provided on any one of a bottom surface of the adaptor and a top surface of the seating portion, and a magnetic substance or a sub magnet may be provided on the other one to be attached to the magnet.

The tool change system according to an embodiment of the present disclosure may further include a sub pressing portion disposed on a lower side of the pressing portion to press the lever upwardly, and the pressing portion may be configured to press the lever downwardly.

A roller may be provided on at least one of the pressing portion or the sub pressing portion to come into contact with the lever.

DETAILED DESCRIPTION OF THE EMBODIMENTS

Figure 1:
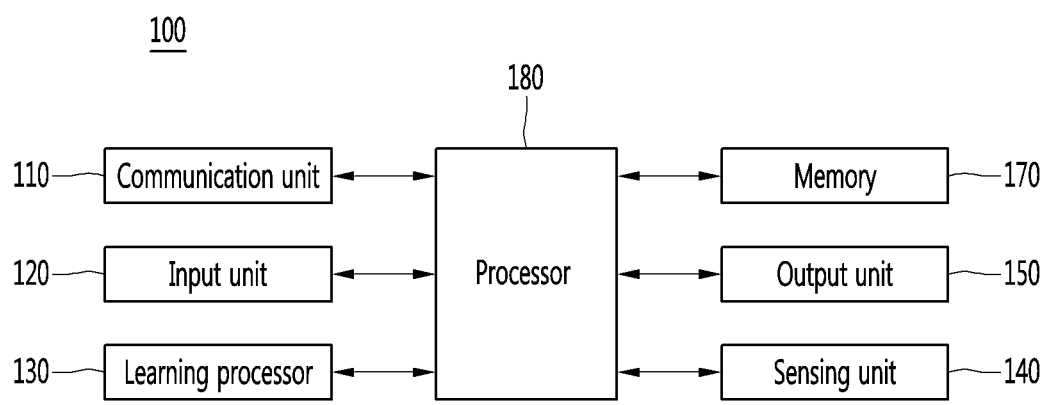
FIG. 1 illustrates an AI device 100 including a robot according to an embodiment of the present invention.

Hereinafter, specific embodiments of the present disclosure will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

[0013] Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
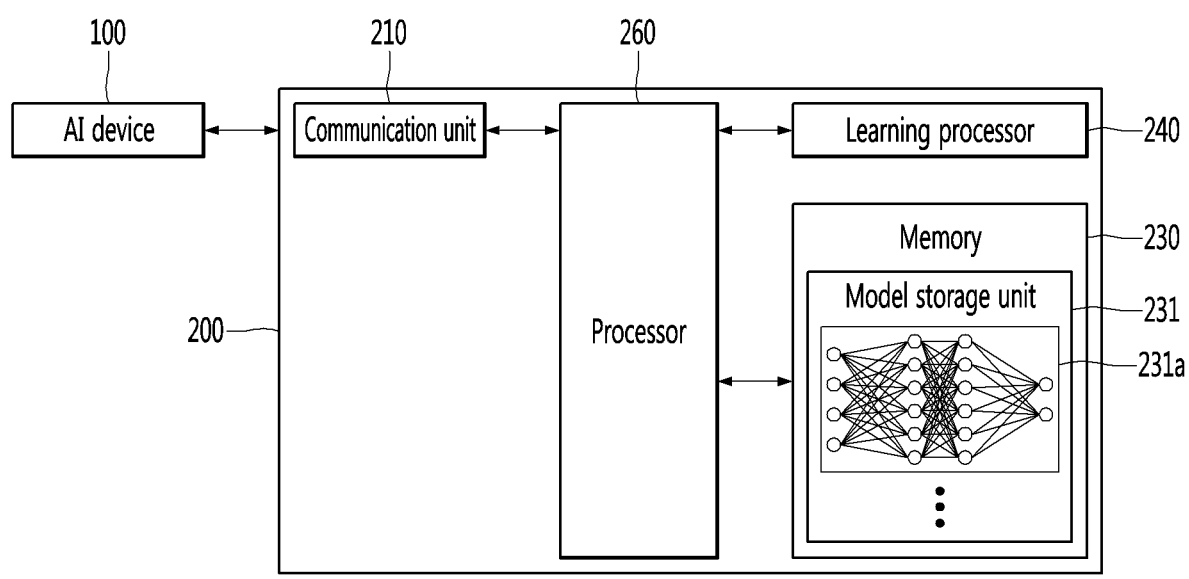
FIG. 2 illustrates an AI server 200 connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
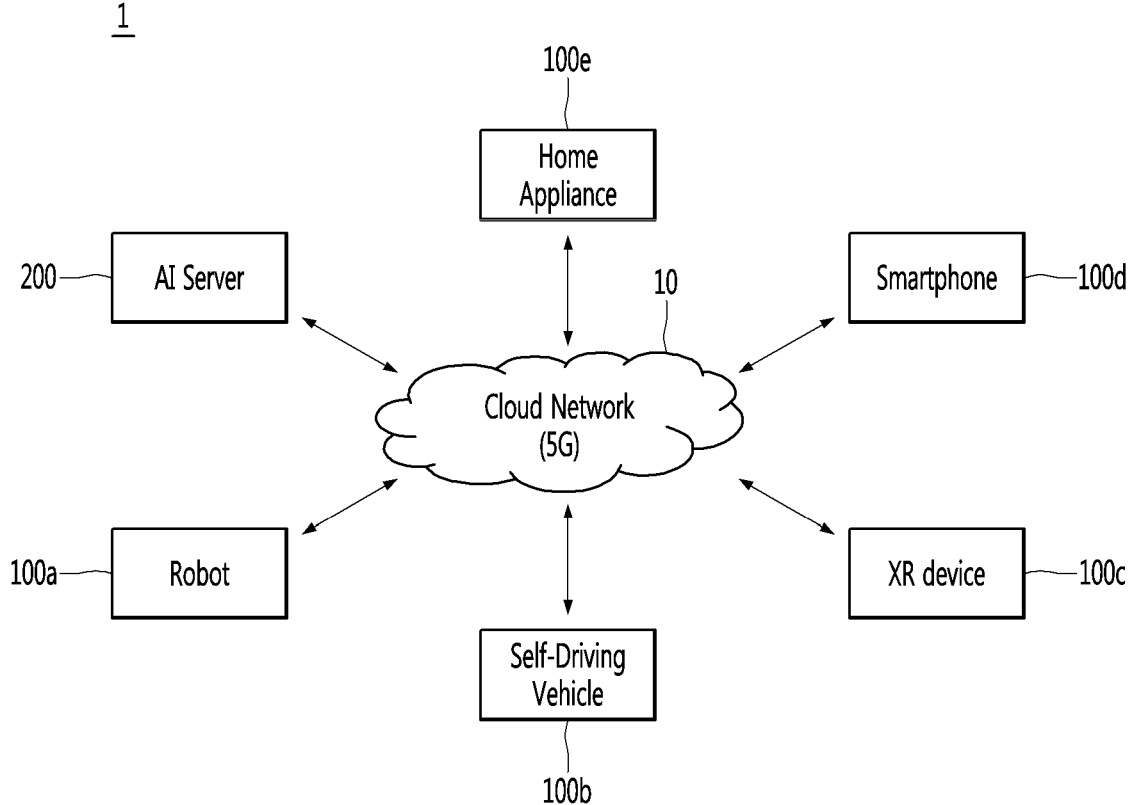
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
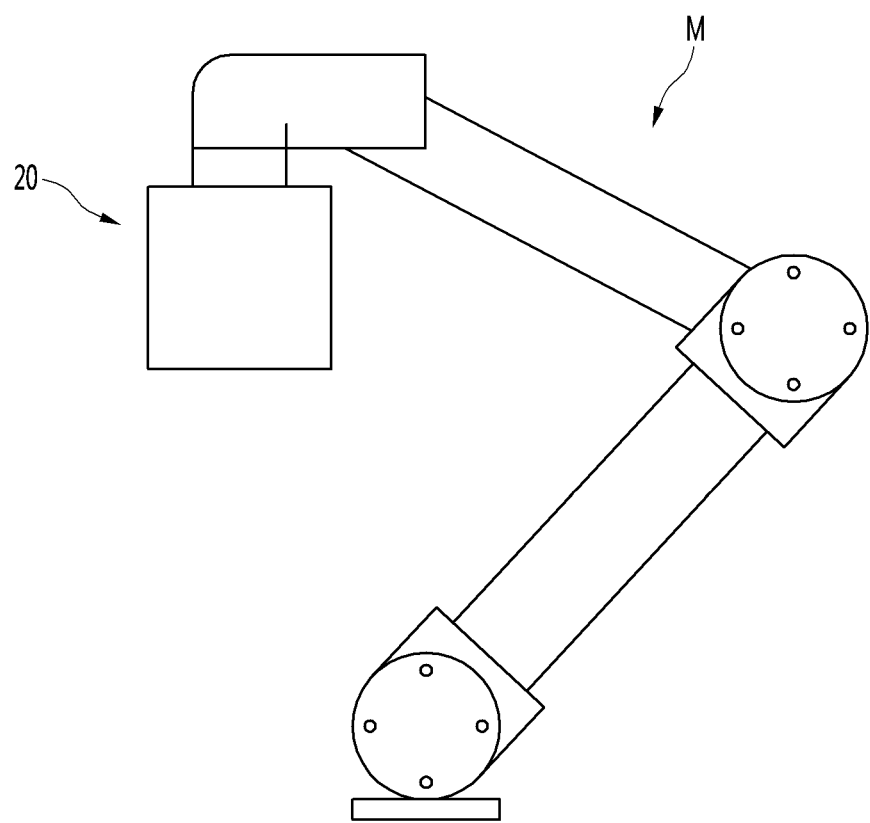
FIG. 4 is a schematic view illustrating a state in which a tool changer according to an embodiment of the present disclosure is coupled to a manipulator.
Figure 5:
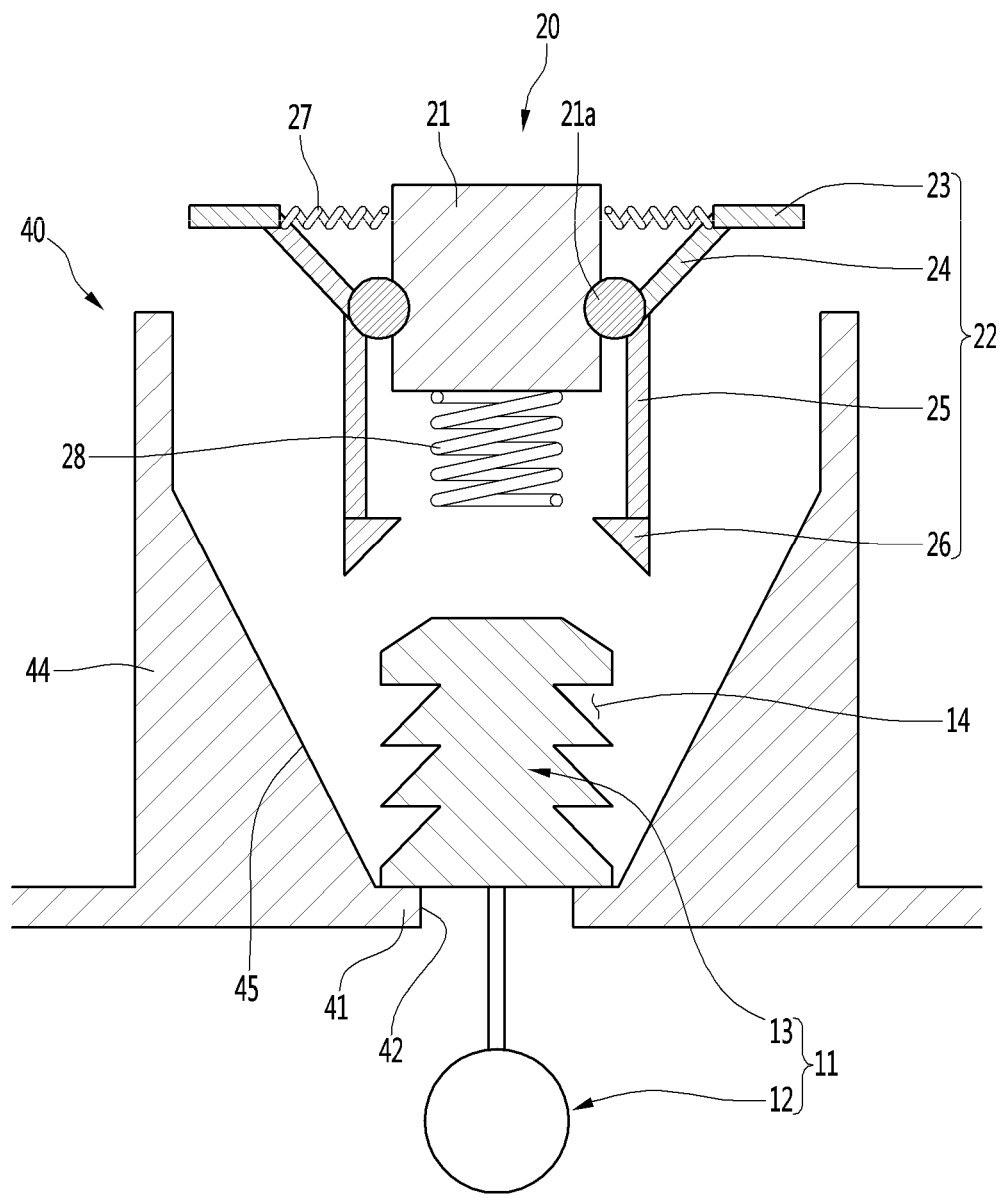
FIG. 5 is a view illustrating a tool change system according to an embodiment of the present disclosure.
Figure 6:
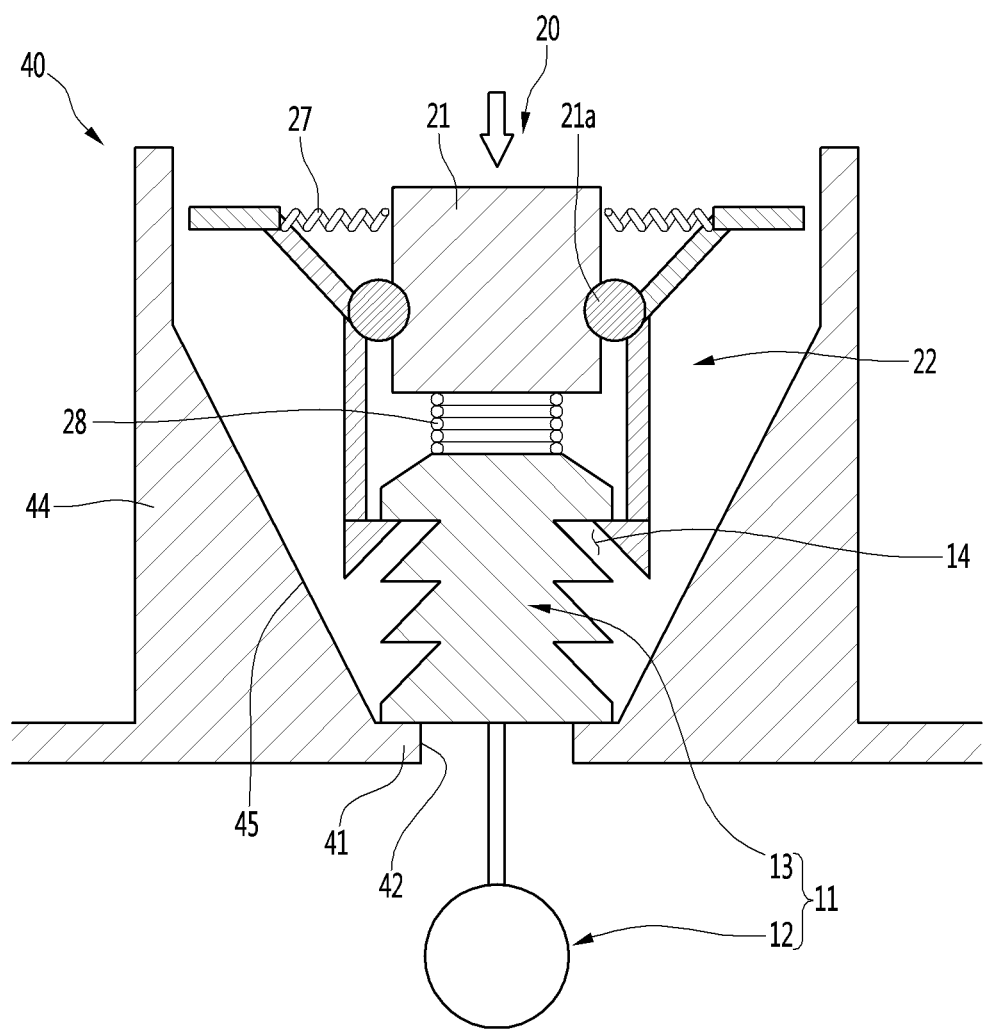
FIG. 6 is a view to explain a tool being fastened to a tool changer shown in FIG. 5.
Figure 7:
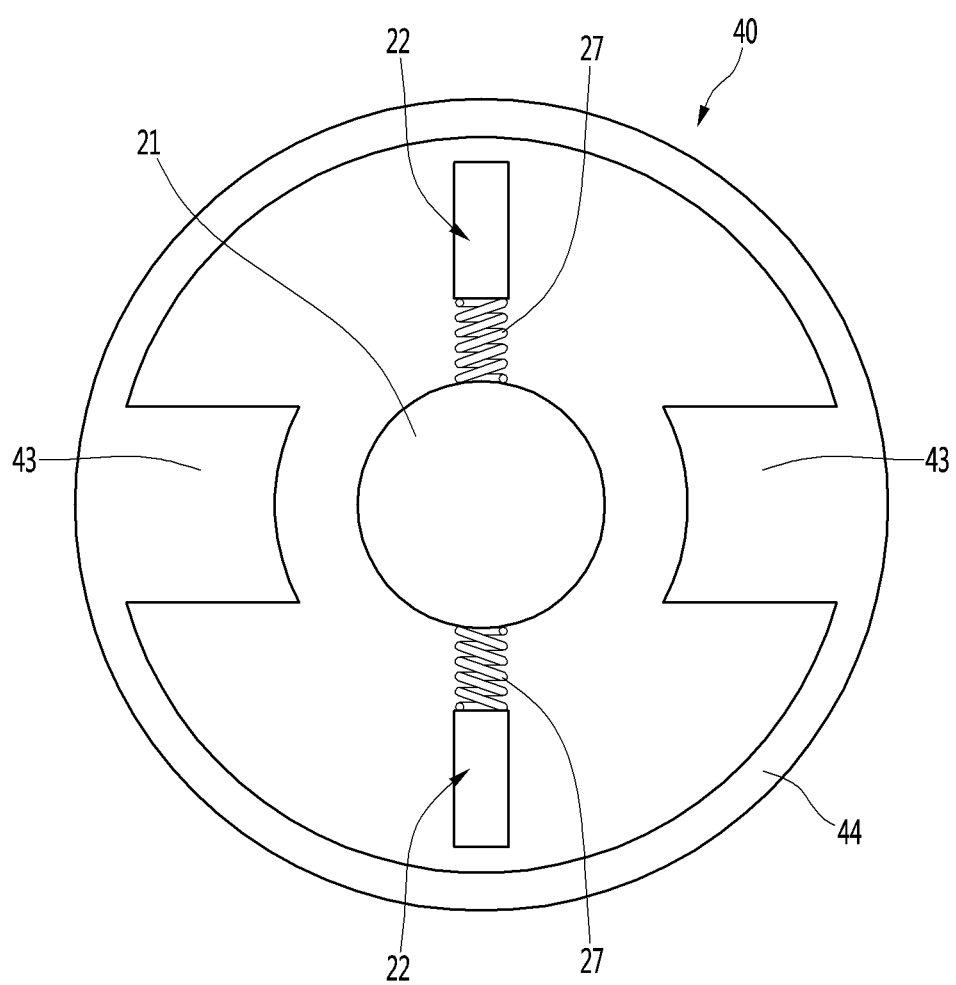
FIG. 7 is a top view of the tool change system according to an embodiment of the present disclosure.
Figure 8:
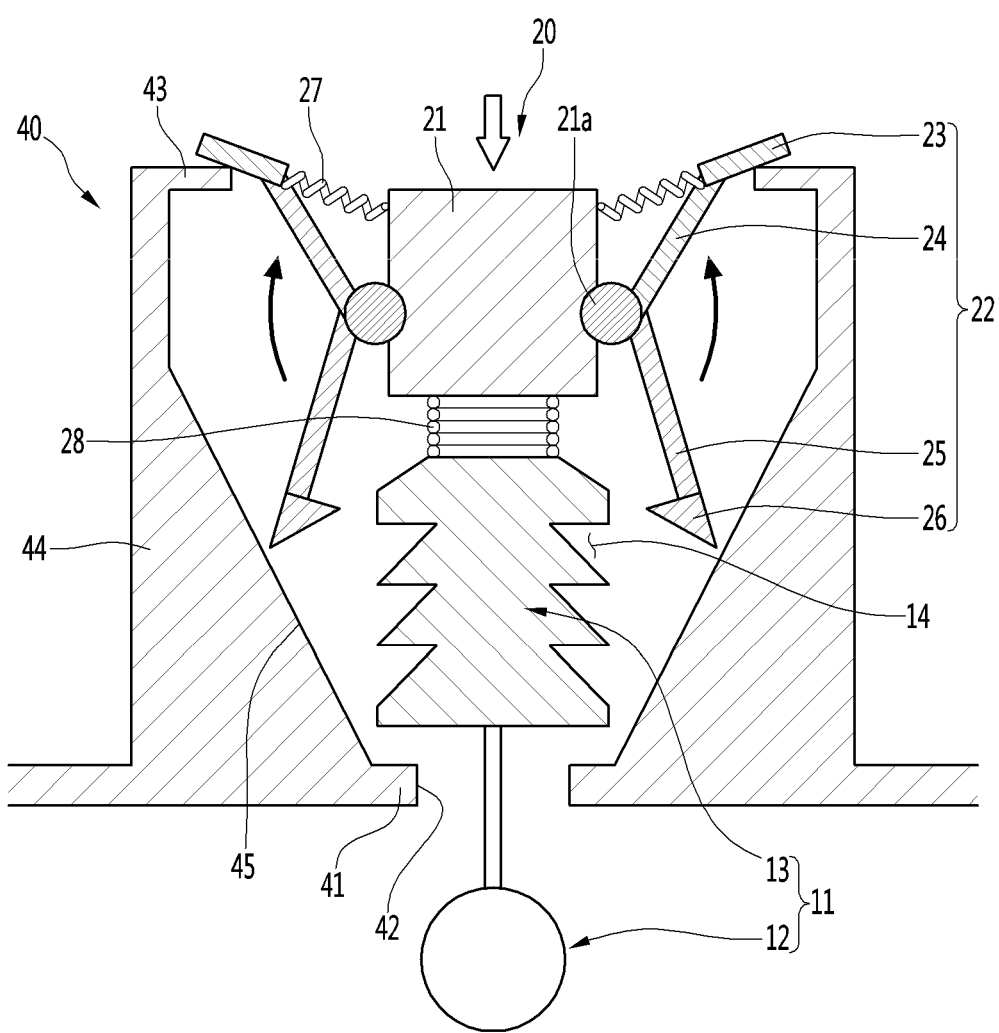
FIGS. 8 and 9 are views to explain the tool being decoupled from the tool changer shown in FIG. 5.
Figure 9:
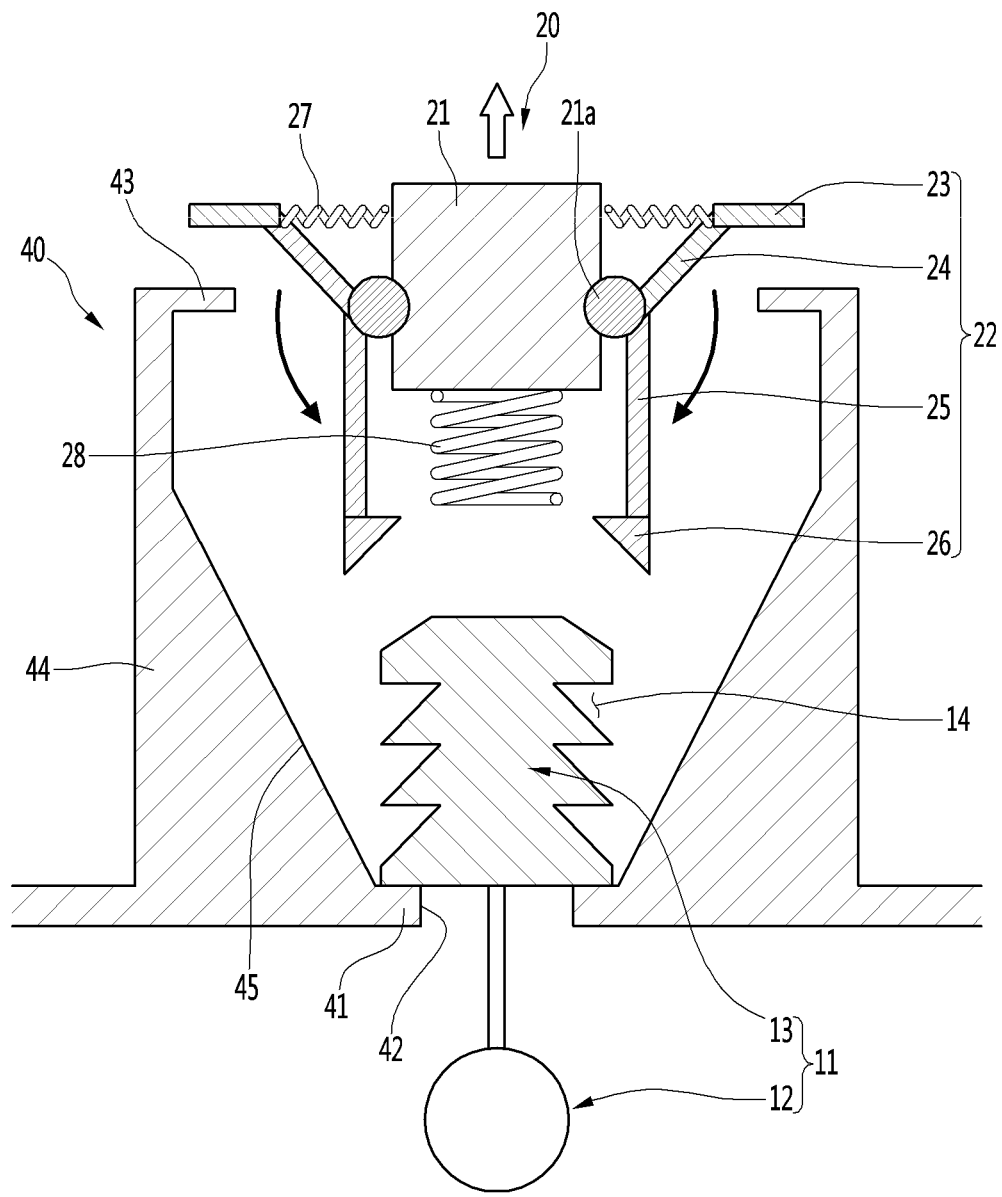

FIG. 4 is a schematic view illustrating a state in which a tool changer according to an embodiment of the present disclosure is coupled to a manipulator, FIG. 5 is a view illustrating a tool change system according to an embodiment of the present disclosure, FIG. 6 is a view to explain a tool being fastened to a tool changer shown in FIG. 5, FIG. 7 is a top view of the tool change system according to an embodiment of the present disclosure, and FIGS. 8 and 9 are views to explain the tool being decoupled from the tool changer shown in FIG. 5.

The tool change system according to an embodiment of the present disclosure may include a tool changer 20 and a tool mounter 40.

The tool changer 20 may be provided on a manipulator M. More specifically, the tool changer 20 may be provided on an end of the manipulator M. The manipulator M may be a component included in the robot 100a described above.

The tool changer 20 may separate a tool 11 from the tool mounter 40, or may mount the tool 11 in the tool mounter 40.

The tool 11 may be a tool that is required to perform a task of the manipulator M.

The tool 11 may include a tool main body 12 and an adaptor 13 fastened to an upper side of the tool main body 12.

The tool main body 12 may be a tool that is required to perform the task of the manipulator M. For example, the tool 11 may be any one of a spoon, a ladle, or a spatula.

The adaptor 13 may be removably fastened to the tool main body 12. In this case, there is an advantage that the adaptor 12 can be fastened to the tool main body 12 which is a commercial item, and can be used.

A locking recess 14 may be formed on an outer circumference of the adaptor 13 to have a hook 26 of a gripper 26 locked thereinto. The locking recess 14 may be formed longways along a circumferential direction of the adaptor 13.

An upper surface of each locking recess 14 may be horizontal, and a lower surface thereof may be formed to be inclined to become higher in an inward direction. An inner edge of the upper surface and an inner edge of the lower surface may be adjacent to each other or may be in contact with each other.

A plurality of locking recesses 14 may be formed, and the plurality of locking recesses 14 may be formed at different heights of the adaptor 13. Accordingly, there are advantages that the gripper 22 and the tool 11 can be easily coupled to each other and a coupling force can be adjusted.

The adaptor 13 may be larger than the tool main body 12 with respect to a horizontal direction. More specifically, the tool main body 12 may have a size enough to pass through an opening 42 of the tool mounter 40, which will be described below, and the adaptor 13 may have a size enough to be caught by the periphery of the opening 42.

The tool changer 20 according to the present embodiment may include a main body 21, the gripper 22, and a spring 27.

The main body 21 may be fastened to the manipulator M. It is preferable that the main body 21 is formed in a substantially cylindrical shape.

A hinge shaft 21a may be provided on an outer circumference of the main body 21. The hinge shaft 21a may be formed longways in a horizontal direction.

The gripper 22 may grip the tool 11. The gripper 22 may be connected to the outer circumference of the main body 21 through the hinge shaft 21a, and may pivot about the hinge shaft 21a.

A plurality of grippers 22 may be provided to be spaced apart from one another in a circumferential direction, that is, in the circumferential direction of the main body 21. Accordingly, the plurality of grippers 22 can reliably grip the tool 11.

The gripper 22 may include a lever 23, links 24, 25, and the hook 26. It is preferable that the lever 23, the links 24, 25, and the hook 26 are integrally formed with one another.

The lever 23 may be spaced apart from the main body 21, and may have the spring 27 connected thereto. The lever 23 may be pressed by a pressing portion 43 (see FIG. 8), which will be described below. The lever 23 may be formed longways in a substantially horizontal direction.

The links 24, 25 may connect the lever 23 and the hook 26. In addition, the links 24, 25 may be connected to the hinge shaft 21a on the outer circumference of the main body 21.

More specifically, the links 24, 25 may include a first link 24 to connect the lever 23 and the hinge shaft 21a, and a second link 25 extended downward from the first link 24.

The first link 24 may connect an inner end of the lever 23 and the hinge shaft 21a. The first link 24 may be formed longways to become lower in an inward direction.

The second link 25 may be formed longways downward from an end of the first link 24 at the side of the hinge shaft 21a. A lower end of the second link 25 may further protrude downward than a lower surface of the main body 21.

The hook 26 may be formed on the second link 25, more specifically, on a lower end of the second link 25. The hook 26 may face a lower side of the main body 21 with respect to a horizontal direction. The hook 26 may be configured to be locked into the locking recess 14 formed on the tool 11.

The hook 26 may include a lower surface which is formed to be inclined to become higher in an inward direction, and an upper surface which is horizontal. An inner edge of the lower surface and an inner edge of the upper surface may be adjacent to each other or may be in contact with each other.

When the tool changer 20 moves down, the lower surface of the hook 26 comes into contact with the adaptor 13 due to the shape of the hook 26, and the grippers 22 may gradually rotate in a direction of making the hooks 26 further apart from each other. When the tool changer 20 moves down to the extent that the hook 26 is locked into the locking recess 14, the gripper 22 may rotate in the opposite direction of the one direction due to elastic force of the spring 27, and the hook 26 may be locked into the locking recess 14.

The spring 27 may connect the main body 21 and the gripper 22. More specifically, the spring 27 may connect the outer circumference of the main body 21 and the lever 23.

The spring 27 may provide elastic force to rotate the gripper 22 in the direction of making the hook 26 locked into the locking recess 14 of the tool 11. More specifically, the spring 27 may be compressed when the lever 23 is closer to the main body 21, and may provide elastic force in a direction of making the lever 23 be away from the main body 21.

The tool changer 20 may further include a lower spring 28.

The lower spring 28 may be disposed on the bottom surface of the main body 21. The lower spring 28 may be compressed between the main body 21 and the tool 11. More specifically, when the grippers 22 grip the tool 11, the lower spring 28 may be compressed between the bottom surface of the main body 21 and the top surface of the tool 11, and may press the tool 11 downward. Accordingly, a coupling force between the grippers 22 and the tool 11 can be enhanced.

The tool 11 can be securely fastened to the tool changer 20 due to the elastic force of the spring 27 and the lower spring 28. That is, the tool 11 can be prevented from being decoupled from the tool changer 20 inadvertently while the manipulator M performs a task.

The tool 11 may be mounted in the tool mounter 40. The tool mounter 40 may be a structure that is installed within a driving range of the manipulator M.

The tool mounter 40 may include a seating portion 41 on which the adaptor 13 is seated, the opening 42 formed in the seating portion 41, and a pressing portion 43 disposed above the seating portion. The tool mounter 40 may further include a column portion 44 protruding upward from the outside of the seating portion 41.

The seating portion 41 may be formed horizontally. An upper surface of the seating portion 41 may come into contact with an edge of the bottom surface of the adaptor 13, thereby supporting the adaptor 13.

The opening 42 may be formed to penetrate through the seating portion 31 in the vertical direction. The opening 42 may have a size enough to allow the tool main body 12 to pass therethrough, but not to allow the adaptor 13 to pass therethrough. Accordingly, when the adaptor 13 is seated on the seating portion 41, the tool main body 12 may pass through the opening 42.

The column portion 44 may protrude upward from the seating portion 41. Accordingly, the adaptor 13 of the tool 11 mounted on the seating portion 41 may be positioned inside the column portion 44. The column portion 44 may have a hollow container shape having an upper side opened, but this should not be considered as limiting. For example, a plurality of column portions 44 may be spaced apart from one another in the circumferential direction, and each column portion 44 may have an arc-shaped cross section.

The column portion 44 can protect the tool 11 seated on the seating portion 41, and can prevent the tool 11 from being released from the tool mounter 40 or from being changed from a mounting position due to external shock.

The column portion 44 may include a guide surface 45 which is formed to be inclined inward in a downward direction. The guide surface 45 may form at least a portion of the inner surface of the column portion 44. When the column portion 44 has a hollow container shape, the guide surface 45 may have a tapering shape.

The guide surface 45 may guide the adaptor 13 such that the tool 11 decoupled from the tool changer 20 and dropping down to the seating portion 41 is mounted in position. More specifically, when the adaptor 13 is decoupled from the grippers 22 by the pressing portion 43, which will be described below, the tool 11 may drop down, and the adaptor 13 may be guided by the guide surface to be positioned in position where the tool main body 12 passes through the opening 42.

The pressing portion 43 may be disposed above the seating portion 41. The pressing portion 43 may press the gripper 22 to rotate, and accordingly, the tool 11 may be decoupled from the gripper 22.

The pressing portion 43 may protrude inward from the column portion 44, more specifically, an upper end of the column portion 44. That is, the column portion 44 may connect the seating portion 41 and the pressing portion 43. The column portion 44 and the pressing portion 43 may be integrally formed with each other.

The pressing portion 43 may press the gripper 22, more specifically, the lever 23 upwardly. More specifically, the manipulator M may move down the tool changer 20 toward the inside of the column portion 44 such that the lever 23 is caught by the pressing portion 43.

Accordingly, the lever 23 may be pressed upward by the pressing portion 43, and the grippers 22 may rotate in the direction of making the hooks 26 further apart from each other. Accordingly, the hook 26 of the gripper 22 may be released from the locking recess 14 of the adaptor 13, and the tool 11 may be decoupled from the tool changer 20. The tool 11 decoupled from the tool changer 20 may drop down and may be mounted in the tool mounter 40.

A plurality of pressing portions 43 may be provided to be spaced apart from one another in the circumferential direction. Accordingly, the plurality of grippers 22 may be rotated by the pressing portions 43, simultaneously, and the tool 11 can be smoothly decoupled from the tool changer 20.

A spacing angle between the plurality of grippers 22 may be the same as a spacing angle between the plurality of pressing portions 43. For example, as shown in FIG. 7, two grippers 22 may be spaced apart from each other by 180 degrees, and two pressing portions 43 may be spaced apart from each other by 180 degrees. In another example, three grippers may be spaced apart from one another by 120 degrees, and three pressing portions 43 may be spaced apart from one another by 120 degrees.

The manipulator M may decouple one tool 11 coupled to the tool changer 20 and mount the tool in one tool mounter 40, and may couple the tool 11 mounted in another tool mounter 40 to the tool changer 20. That is, the tool changer 20 may change the tool 11.

Hereinafter, a process of coupling the tool 11 mounted in the tool mounter 40 to the tool changer 20 will be described with reference to FIGS. 5 to 7.

The manipulator M may move down the tool changer 20 to the tool mounter 40 to allow the grippers 22 to pass between the plurality of pressing portions 43. Accordingly, the grippers 22 may avoid the pressing portions 43 and may move down to the insides of the column portions 44.

The tool changer 20 may move down until the hooks 26 are locked into the locking recesses 14 of the tool 11.

More specifically, the tool changer 20 may further move down with the lower spring 28 coming into contact with the top surface of the adaptor 13. Accordingly, the lower spring 28 may be compressed between the adaptor 13 and the main body 21.

In this state, when the tool changer 20 continuously moves down, the hooks 26 may come into contact with the adaptor 13 and the grippers 222 may rotate in the direction of making the hooks 26 further apart from each other. In this state, when the tool changer 20 further moves down, the hooks 26 may be locked into the locking recesses 14, and the grippers 22 may rotate in the opposite direction due to the recovering force of the spring 27. Accordingly, the tool 11 may be coupled to the tool changer 20.

When the tool 11 is coupled the tool changer 20, the manipulator M may move up the tool changer 20 to allow the gripers 22 to pass between the plurality of pressing portions 43. Accordingly, the grippers 22 may avoid the pressing portions 43 and may separate the tool 11 from the tool mounter 40. Thereafter, the manipulator M may perform a task (for example, cooking) by using the tool 11.

Hereinafter, a process of decoupling the tool 11 coupled to the tool changer 20 and mounting the tool 11 in the tool mounter 40 will be described with reference to FIGS. 8 and 9.

The manipulator M may move down the tool changer 20 to the tool mounter 40 to have the grippers 22 caught by the pressing portions 43.

Accordingly, the levers 23 of the grippers 22 may be pressed upward by the pressing portions 43, and the grippers 22 may rotate in the direction of making the hooks 25 further apart from each other, such that the hooks 26 are released from the locking recesses 14 of the adaptor 13.

When the hooks 26 are released from the locking recesses 14, the tool 11 may drop down to a lower side due to the recovering force of the lower spring 28 and the gravity. The tool 11 dropping down may be guided by the guide surface 45 to be positioned in position. That is, the tool main body 12 may pass through the opening 42 and the edge of the bottom surface of the adaptor 13 may be seated on the seating portion 41.

Accordingly, the tool 11 may be decoupled from the tool changer 20 and may be mounted in the tool mounter 40. In addition, since the tool 11 is mounted in position in the tool mounter 40, reliability in a process of coupling the tool changer 20 to the tool 11 mounted in the tool mounter 40 afterward can be enhanced.

Figure 10:
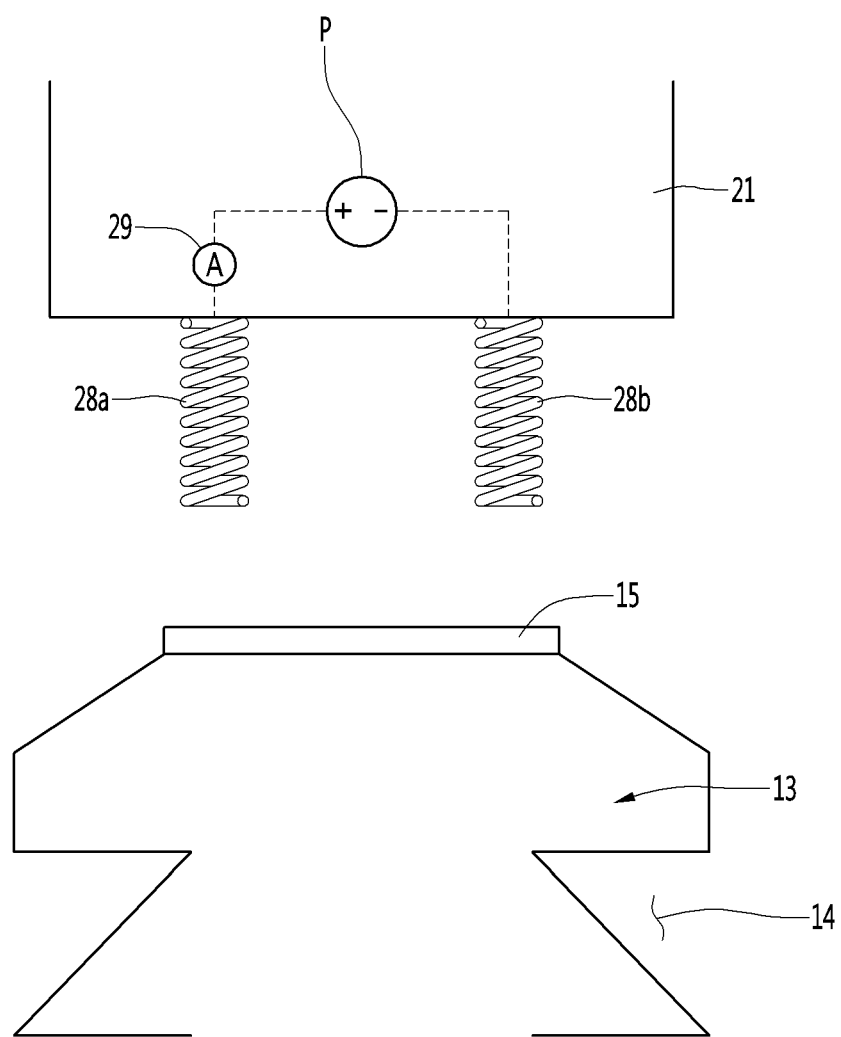
FIG. 10 is a view illustrating an example of a fastening detection mechanism for detecting a tool fastened to the tool changer.

FIG. 10 is a view illustrating an example of a fastening detection mechanism for detecting the tool fastened to the tool changer.

The tool changer 20 may include a fastening detection mechanism to detect whether the tool 11 is fastened to the tool changer 20.

The fastening detection mechanism according to the present example may include one pair of spring terminals 28a, 28b disposed on the bottom surface of the main body 21. The spring terminals 28a, 28b may be substituted for the lower spring 28 described above.

The main body 21 may include a power source P such as a battery, and a current sensor 29 to detect a current flowing by the power source P, which are embedded in the main body 21. Both poles of the power source P may be connected with the one pair of spring terminals 28a, 28b, respectively.

In addition, a conducting plate 15 may be disposed on the top surface of the adaptor 13 of the tool 11.

When the tool 11 is coupled to the tool changer 20, the spring terminals 28a, 28b may come into contact with the conducting plate 15, and may be compressed between the conducting plate 15 and the main body 21. That is, when the tool 11 is coupled to the tool changer 20, the current of the power source P may flow via one spring terminal 28a, the conducting plate 15, and the other spring terminal 28b. Accordingly, when a current is detected by the current sensor 29, it may be determined that the tool 11 is fastened to the tool changer 20.

Figure 11:
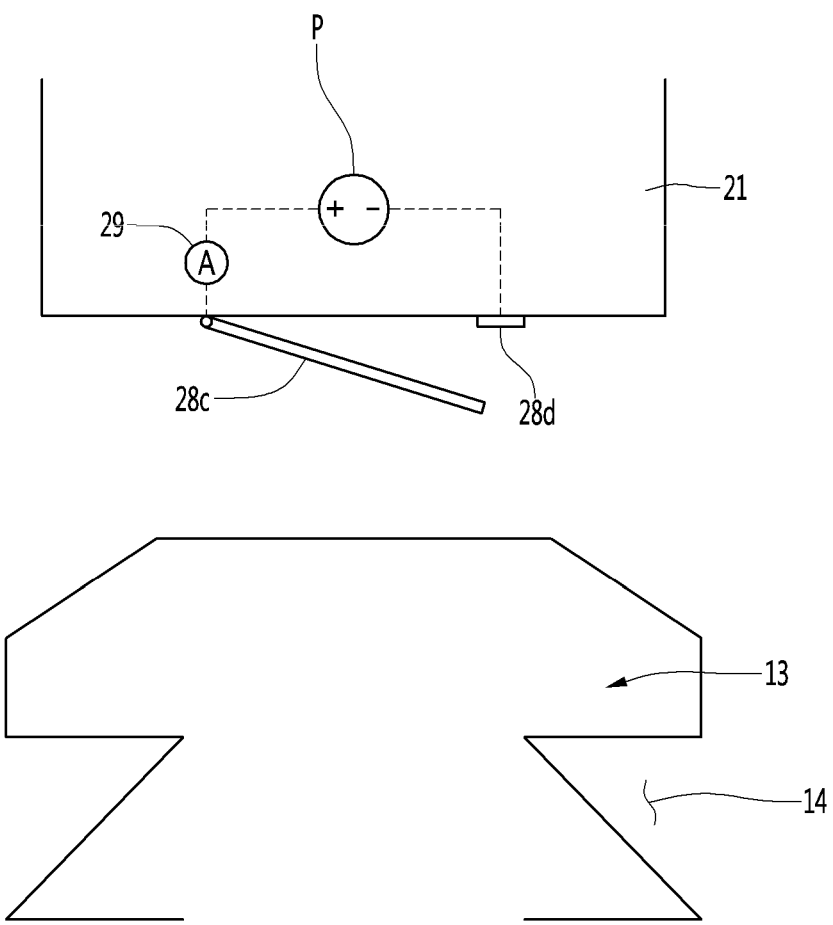
FIG. 11 is a view illustrating another example of the fastening detection mechanism for detecting a tool fastened to the tool changer.

FIG. 11 is a view illustrating another example of the fastening detection mechanism to detect the tool fastened to the tool changer.

The fastening detection mechanism according to the present example may include a switch 28c disposed on the bottom surface of the main body 21, and a terminal 28d that the switch is connected to/disconnected from.

The main body 21 may include a power source P such as a battery and a current sensor 29 to detect a current flowing by the power source P, which are embedded in the main body 21. Both poles of the power source P may be connected to the switch 28c and the terminal 28d, respectively.

One end of the switch 28c may be connected to the bottom surface of the main body 21. The switch 28c has an elastic structure such that the other end of the switch 28c is usually spaced apart from the terminal 28d.

When the tool 11 is coupled to the tool changer 20, the switch 28c may be pressed upward by the tool, more specifically, by the adaptor 13, and may come into contact with the terminal 28d. That is, when the tool 11 is coupled to the tool changer 20, the current of the power source P may flow via the switch 28c and the terminal 28d. Accordingly, when the current is detected by the current sensor 29, it may be determined that the tool 11 is fastened to the tool changer 20.

Figure 12:
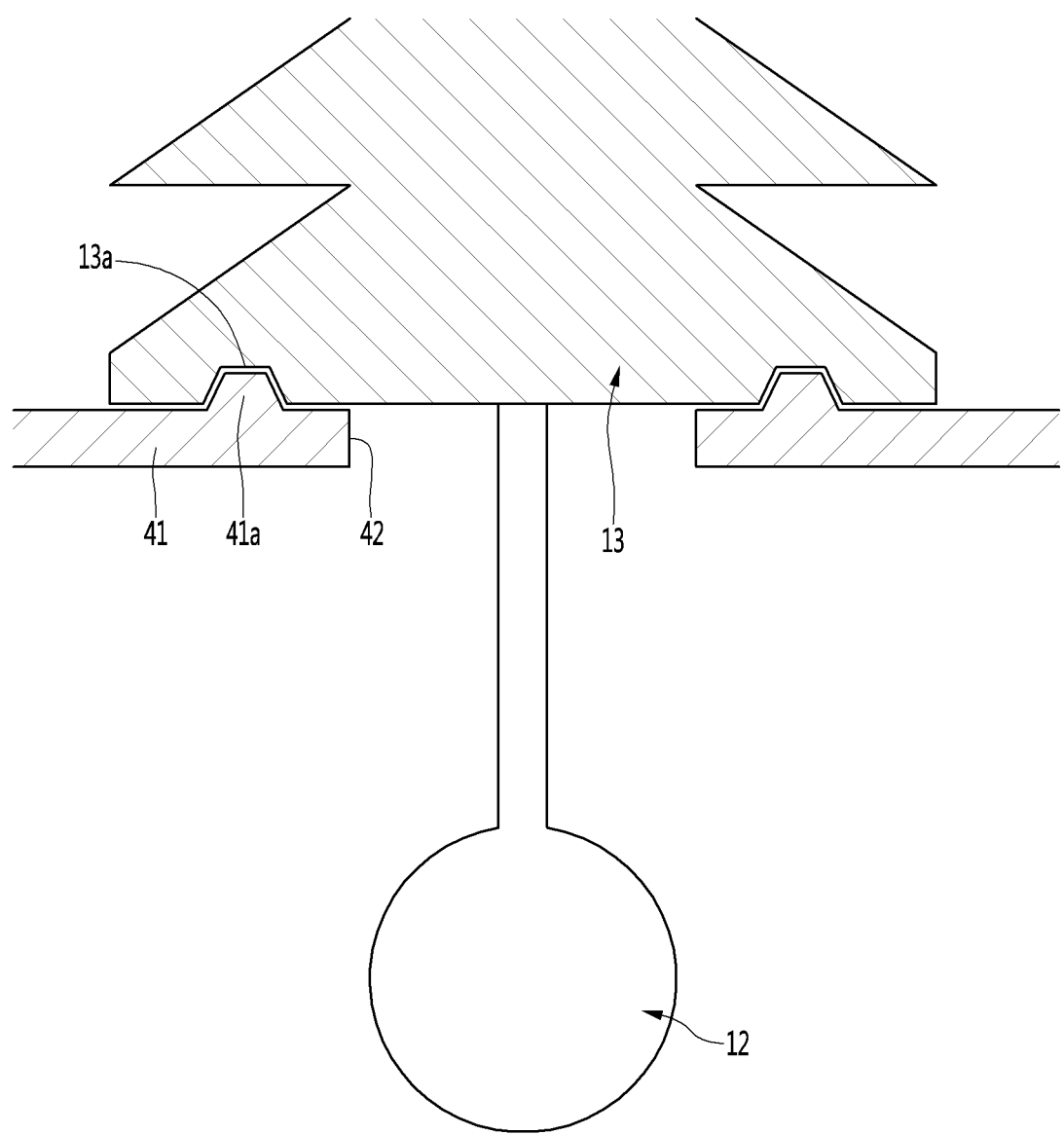
FIG. 12 is a view illustrating an example of a seating guide for guiding the tool to be seated in position of a tool mounter.

FIG. 12 is a view illustrating an example of a seating guide to guide the tool to be mounted in position in the tool mounter.

The tool mounter 40 may include a seating guide to guide the tool 11 to be seated in position in the tool mounter 40.

The seating guide according to the present example may include a guide protrusion 41a, and a guide recess 13a into which the guide protrusion 41a is inserted.

The guide protrusion 41a may be formed on any one of the bottom surface of the adaptor 13 and the top surface of the seating portion 41, and the guide recess 13a may be formed on the other one of the bottom surface of the adaptor 13 and the top surface of the seating portion 41. Hereinafter, the case in which the guide recess 13a is formed on the bottom surface of the adaptor 13 and the guide protrusion 41a is formed on the top surface of the seating portion 41 as shown in FIG. 12 will be described by way of an example.

The guide protrusion 41a may protrude upward from the top surface of the seating portion 41, and the guide recess 13a may be recessed upward on the bottom surface of the adaptor 13. The guide protrusion 41a and the guide recess 13a may be formed in a substantially hook shape, but are not limited hereto.

Cross sections of the guide protrusion 41a and the guide recess 13a may have a shape becoming wider in a downward direction. Accordingly, the adaptor 13 of the tool 11 decoupled from the tool changer 20 and dropping down may be smoothly guided to be positioned in position on the seating portion 41.

Figure 13:
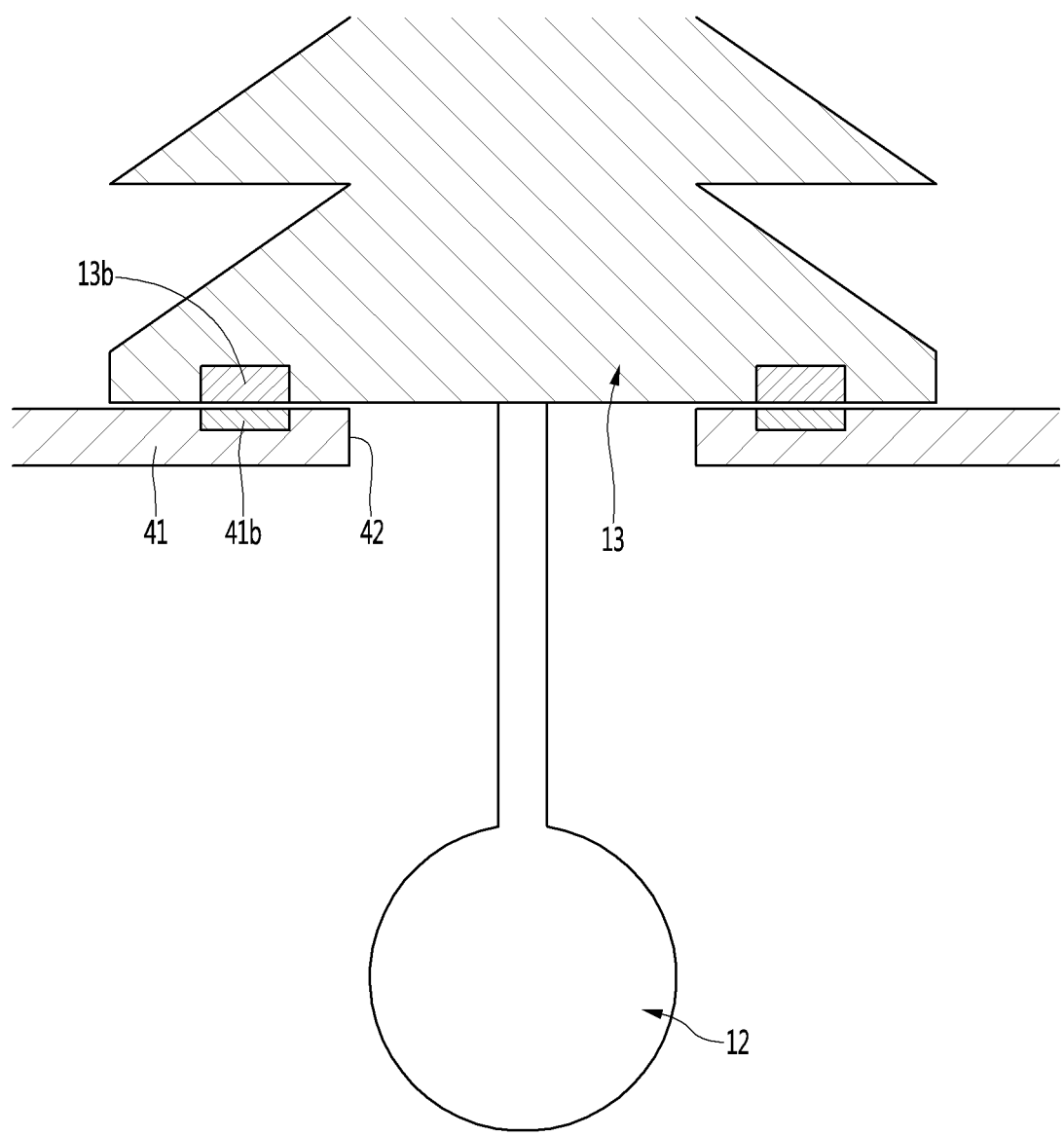
FIG. 13 is a view illustrating another example of the seating guide for guiding the tool to be seated in position of the tool mounter.

FIG. 13 is a view illustrating another example of the seating guide to guide the tool to be seated in position in the tool mounter.

The seating guide according to the present example may include a magnet 41b and a magnetic substance 13b attached to the magnet 41b. Instead of the magnetic substance 13b, a sub magnet may be used.

The magnet 41b may be disposed on any one of the bottom surface of the adaptor 13 and the top surface of the seating portion 41, and the magnetic substance 13b may be disposed on the other one of the bottom surface of the adaptor 13 and the top surface of the seating portion 41. The magnet 41b and the magnetic substance 13b attached to each other may overlap each other in the vertical direction.

Accordingly, the adaptor 13 of the tool 11 decoupled from the tool changer 20 and dropping down may be smoothly guided to be positioned in position on the seating portion 41.

Figure 14:
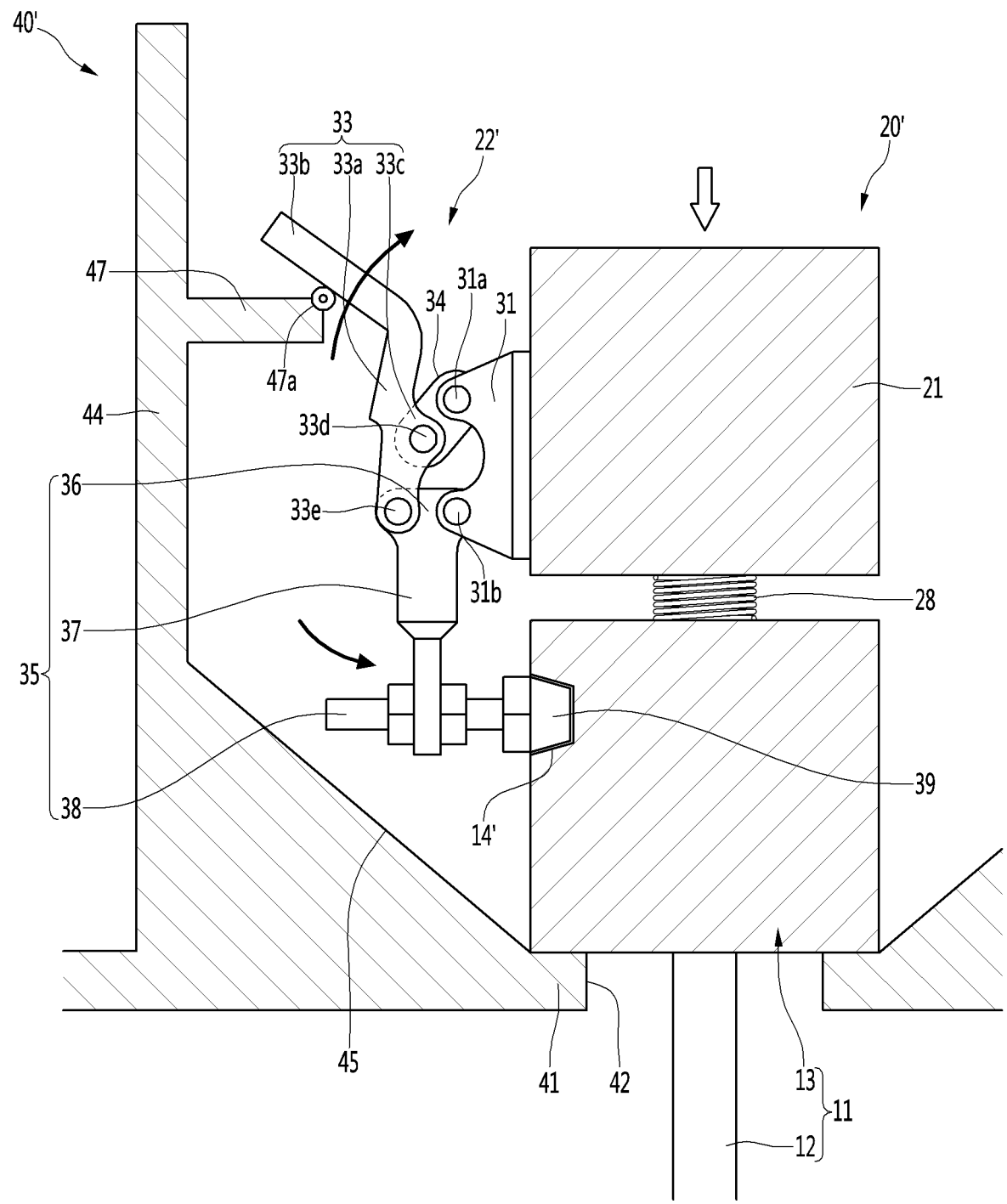
FIG. 14 is a view illustrating a tool change system according to another embodiment of the present disclosure.
Figure 15:
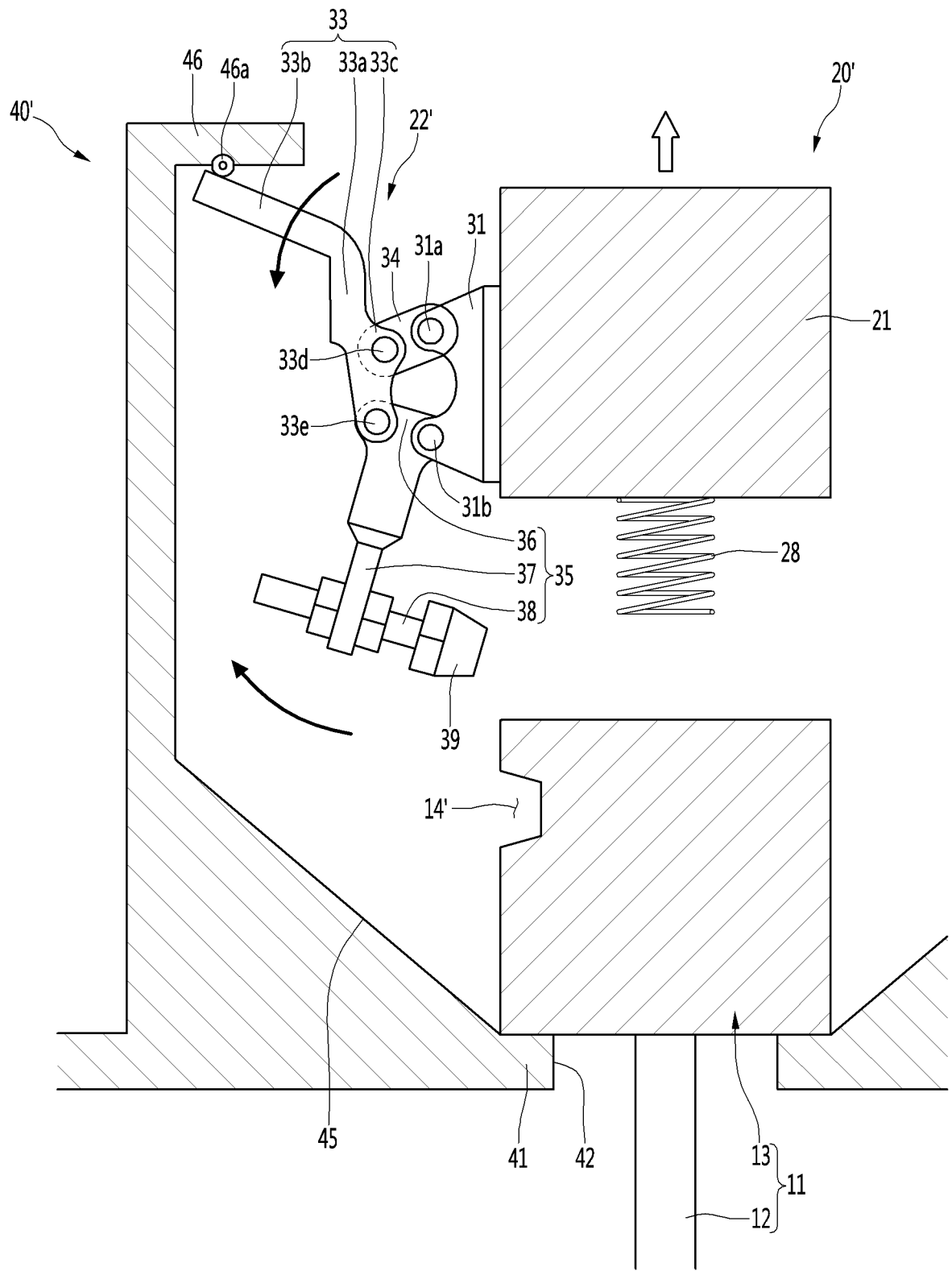
FIG. 15 is a view to explain a tool being decoupled from a tool changer shown in FIG. 14.

FIG. 14 is a view illustrating a tool change system according to another embodiment of the present disclosure, and FIG. 15 is a view to explain a tool being decoupled from a tool changer of FIG. 14.

Hereinafter, the same operations and elements as those of the above-described embodiments will not be described and the difference therefrom will be highlighted.

A locking recess 14' may be formed on the outer circumference of the adaptor 13 of the tool 11 according to the present embodiment to allow a hook 39 of a gripper 22' to be locked thereinto. The locking recess 14' may be formed on the outer circumference of the adaptor 13.

An inner circumference of the locking recess 14' may have a tapering shape to have a diameter becoming smaller in an inward direction. Accordingly, the hook 39 of the gripper 22' can be reliably inserted into the locking recess 14'.

According to the present embodiment, a plurality of grippers 22' may be provided to be spaced apart from one another in a circumferential direction, that is, in the circumferential direction of the main body 21. Accordingly, a plurality of locking recesses 14' may be formed. The plurality of locking recesses 14' may be formed to be spaced apart from one another in the circumferential direction of the adaptor 13.

The tool changer 20 according to the present embodiment may include the main body 21, a bracket 31, and the gripper 22.

The bracket 31 may be disposed on the outer circumference of the main body 21. The bracket 31 may include one pair of bracket connection shafts 31a, 31b spaced apart from each other. Each of the bracket connection shafts 31a, 31b may be formed longways in the horizontal direction.

The one pair of bracket connection shafts 31a, 31b may include an upper bracket connection shaft 31a, and a lower bracket connection shaft 31b positioned under the upper bracket connection shaft 31a.

One end of a link 34 may be connected to the upper bracket connection shaft 31a. The one end of the link 34 may rotate about the upper bracket connection shaft 31a.

One end of a connection portion 36 of a driving portion 35 may be connected to the lower bracket connection shaft 31b. The one end of the connection portion 36 may rotate about the lower bracket connection shaft 31b.

The gripper 22' may be connected to the bracket 31 and may grip the tool 11.

More specifically, the gripper 22' may include a lever 33, the link 34, the driving portion 35, and the hook 39. The lever 33, the link 34, the driving portion 35, and the hook 39 may be formed as separate elements and may be fastened to one another.

The lever 33 may be spaced apart from the main body 21, and may have the link 34 and the driving portion 35 connected thereto. The lever 33 may be pressed by a pressing portion 46 and a sub pressing portion 47.

More specifically, the lever 33 may include a lever main body 33a, a lever arm 33b extended from an upper end of the lever main body 33a, and a lever connection portion 33c connected to a lower end of the lever main body 33a. Preferably, the lever main body 33a, the lever arm 33b, and the lever connection portion 33c may be integrally formed with one another.

The lever main body 33a may have a bar-like shape formed longways substantially in the vertical direction.

The lever arm 33b may be extended outward from the upper end of the lever main body 33a longways. The lever arm 33b may have a long bar-like shape becoming higher in an outward direction.

The lever arm 33b may be pressed downward by the pressing portion 46, or may be pressed upward by the sub pressing portion 47.

The lever connection portion 33c may protrude inward from the lower end of the lever main body 33a, and may be extended downward. The lever connection portion 33c may include one pair of lever connection shafts 33d, 33e spaced apart from each other. Each of the lever connection shafts 33d, 33e may be formed longways in the horizontal direction.

The one pair of lever connection shafts 33d, 33e may include an upper lever connection shaft 33d, and a lower lever connection shaft 33e positioned under the upper lever connection shaft 33d.

The other end of the link 34 may be connected to the upper lever connection shaft 33d. The other end of the link 34 may rotate about the upper lever connection shaft 33d.

The other end of the connection portion 36 of the driving portion 35 may be connected to the lower lever connection shaft 33e. The other end of the connection portion 36 may rotate about the lower lever connection shaft 33e.

A distance between the one pair of lever connection shafts 33d, 33e may be shorter than a distance between the one pair of bracket connection shafts 31a, 31b. That is, a distance between the link 34 and the connection portion 36 becomes shorter toward the outside.

The link 34 may connect the bracket 31 and the lever 33. One end of the link 34 may be rotatably connected to the upper bracket connection shaft 31a of the bracket 31, and the other end may be rotatably connected to the upper lever connection shaft 33d of the lever 33.

The driving portion 35 may connect the bracket 31 and the lever 33. The driving portion 35 may be positioned under the link 34.

More specifically, the driving portion 35 may include the connection portion 36, an extension portion 37, and a fastening member 38.

The connection portion 36 may connect the bracket 31 and the lever 33. One end of the connection portion 36 may be rotatably connected to the lower bracket connection shaft 31b of the bracket 31, and the other end may be rotatably connected to the lower lever connection shaft 33e of the lever 33.

The extension portion 37 may be formed lengthways downward from the connection portion 36. The extension portion 37 may be orthogonal to the connection portion 36. A lower end of the extension portion 37 may be position at height lower than the bottom surface of the main body 21.

The fastening member 38 may be fastened to a lower end of the extension portion 37. The fastening member 38 may be parallel to the connection portion 36 and may be orthogonal to the extension portion 37.

The hook 39 may be disposed on the driving portion 35. More specifically, the hook 39 may be disposed on an inner end of the fastening member 38. The hook 39 may face a lower side of the main body 21. The hook 39 may be locked into the locking recess 14' formed on the tool 11.

The hook 39 may have a tapering shape to have a diameter becoming smaller in the inward direction. In addition, the hook 39 may include a material having relatively high coefficient of elasticity and high coefficient of friction. For example, the hook 39 may be formed with urethane material.

To this end, the hook 39 may be smoothly inserted into the locking recess 14', and may be fitted into the locking recess 14', such that motion of the manipulator can be immediately transferred to the tool 11. That is, motion sensitivity of the tool 11 can be increased.

A tool mounter 40' according to the present embodiment may include the pressing portion 46 and the sub pressing portion 47.

The pressing portion 46 and the sub pressing portion 47 may be positioned above the seating portion 41.

The pressing portion 46 and the sub pressing portion 47 may protrude inward from the column portion 44. The pressing portion 46 may be positioned at a higher point than the sub pressing portion 47. More specifically, a portion of the column portion 44 from which the pressing portion 46 protrudes may be higher than a portion from which the sub pressing portion 47 protrudes. For example, the pressing portion 46 may protrude inward from the upper end of the column portion 44, and the sub pressing portion 47 may protrude inward from an inner circumference of the column portion 44.

A plurality of pressing portions 46 and a plurality of sub pressing portions 47 may be provided. The plurality of pressing portions 46 may be spaced apart from one another in the circumferential direction, and the plurality of sub pressing portions 47 may be spaced apart from one another in the circumferential direction.

For example, three pressing portions 46 may be spaced apart from one another by 120 degrees, and three sub pressing portions 47 may be spaced apart from one another by 120 degrees. In this case, three grippers 22' included in the tool changer 20' may be spaced apart from one another by 120 degrees.

The pressing portion 46 and the sub pressing portion 47 may not overlap in the vertical direction. That is, the pressing portion 46 may face downward between sub pressing portions 47 different from each other, and the sub pressing portion 47 may face upward between pressing portions 46 different from each other.

The pressing portion 46 may press the gripper 22' and may rotate the gripper 22' in one direction, and accordingly, the tool 11 may be decoupled from the gripper 22'. The sub pressing portion 47 may press the gripper 22' and may rotate the gripper 22' in the opposite direction, and accordingly, the tool 11 may be coupled to the gripper 22'.

The pressing portion 46 may press the lever 33 of the gripper 22', more specifically, the lever arm 33b, downward. The manipulator M may move up the tool changer 20 inside the column portion 44 to have the lever 33 caught by the pressing portion 46. Since the pressing portion 46 and the sub pressing portion 47 does not overlap in the vertical direction, the tool changer 20' may not be interrupted by the sub pressing portion 47 and may smoothly move up.

Accordingly, as shown in FIG. 15, the lever 33 may be pressed downward by the pressing portion 46, and the driving portion 35 connected thereto may pivot outward. Accordingly, the hook 39 of the gripper 22' may be released from the locking recess 14' of the adaptor 13, and the tool 11 may be decoupled from the tool changer 20'. The tool 11 decoupled from the tool changer 20' may drop down and may be mounted in the tool mounter 40.

The sub pressing portion 47 may press the lever 33 of the gripper 22', more specifically, the lever arm 33b, upward. The manipulator M may move down the tool changer 20 inside the column portion 44 to have the lever 33 caught by the sub pressing portion 47. Since the pressing portion 46 and the sub pressing portion 47 does not overlap in the vertical direction, the tool changer 20' may not be interrupted by the pressing portion 46 and may smoothly move down.

Accordingly, as shown in FIG. 14, the lever 33 may be pressed upward by the sub pressing portion 47, and the driving portion 35 connected thereto may pivot inward. Accordingly, the hook 39 of the gripper 22' may be inserted into the locking recess 14' of the adaptor 13, and the tool 11 may be coupled to the tool changer 20'.

In addition, a roller 46a, 47a may be included in at least one of the pressing portion 46 or the sub pressing portion 47 to be in contact with the lever 33. The roller 46a, 47a may make relative movement between the lever 33 and the pressing portion 46 or the sub pressing portion 47 smooth in the process of pressing the lever 33. A rotation shaft of the roller 46a, 47a may be horizontal.

Hereinafter, the case in which the rollers 46a, 47a are included in the pressing portion 46 and the sub pressing portion 47, respectively, will be described by way of an example.

The pressing portion 46 may include a first roller 46a. The first roller 46a may be disposed on a bottom surface or a lower side corner of an inner end of the pressing portion 46.

The sub pressing portion 46 may include a second roller 47a. The second roller 47a may be disposed on a top surface or an upper side corner of an inner end of the sub pressing portion 47.

Hereinafter, a process of coupling the tool 11 mounted in the tool mounter 40' to the tool changer 20' will be described.

The manipulator M may move down the tool changer 20' to the tool mounter 40' to allow the gripper 22' to pass between the plurality of pressing portions 46. Accordingly, the gripper 22' may avoid the pressing portion 46 and may move down to the inside of the column portion 44.

The tool changer 20' may move down until the hook 39 is locked into the locking recess 14' of the tool 11.

More specifically, the tool changer 20' may further move down with the lower spring 28 coming into contact with the top surface of the adaptor 13. Accordingly, the lower spring 28 may be compressed between the adaptor 13 and the main body 21.

In this state, when the tool changer 20' continuously moves down, the lever 33 of the gripper 22' may come into contact with the sub pressing portion 47, more specifically, the second roller 47a included in the sub pressing portion 47, and may be pressed upward. Accordingly, the driving portion 35 of the gripper 22' may pivot inward, and the hook 39 may be inserted into the locking recess 14' of the adaptor 13. Accordingly, the tool 11 may be coupled to the tool changer 20'.

When the tool 11 is coupled to the tool changer 20', the manipulator M may move up the tool changer 20' to let the tool 11 and the tool changer 20' escape from the upper side of the column portion 44, and the gripper 22' may pass between the plurality of pressing portions 46. Thereafter, the manipulator M may perform a task (for example, cooking) by using the tool 11.

Hereinafter, a process of decoupling the tool 11 coupled to the tool changer 20' and mounting the tool 11 in the tool mounter 40' will be described.

The manipulator M may move down the tool changer 20' to the tool mounter 40' to allow the gripper 22' to pass between the plurality of pressing portions 46. Accordingly, the gripper 22' may avoid the pressing portion 46 and may move down to the inside of the column portion 44.

The manipulator M may stop moving down the tool changer 20' before the lever 33 of the gripper 22' comes into contact with the sub pressing portion 47. In this state, the manipulator M may rotate the tool changer 20' to have the gripper 22' positioned under the pressing portion 46.

Thereafter, the manipulator M may move up the tool changer 20' to have the gripper 22' caught by the pressing portion 46. Accordingly, the lever 33 of the gripper 22' may come into contact with the pressing portion 46, more specifically, the first roller 46a included in the pressing portion 46, and may be pressed downward. Accordingly, the driving portion 35 of the gripper 22' may pivot outward and the hook 39 may be released from the locking recess 14' of the adaptor 13. Accordingly, the tool 11 may be decoupled from the tool changer 20'.

When the hook 39 is released from the locking recess 14', the tool 11 may drop down due to the recovering force of the lower spring 28 and the gravity. The tool 11 dropping down may be guided by the guide surface 45 to be positioned in position. That is, the tool main body 12 may pass through the opening 42 and the edge of the bottom surface of the adaptor 13 may be seated on the seating portion 41.

To this end, the tool 11 may be decoupled from the tool changer 20' and may be mounted in the tool mounter 40'. In addition, since the tool 11 is mounted in position in the tool mounter 40', reliability in a process of coupling the tool changer 20' to the tool 11 mounted in the tool mounter 40' afterward can be enhanced.

The tool change system according to the present embodiment may include the fastening detection mechanism and the seating guide described above.

According to a preferred embodiment of the present disclosure, since the tool changer does not include an actuator for pivoting the gripper, there are advantages that the tool changer can have a compact size, a manufacturing cost can be reduced, and noise is not generated.

In addition, the tool can be coupled to/decoupled from the tool changer by locking or releasing the hook into or from the locking recess. Accordingly, the tool changer can couple/decouple the tool rapidly and easily.

In addition, a coupling force between the tool changer and the tool can be enhanced due to the recovering force of the lower spring.

In addition, it can be easily determined by the fastening detection mechanism whether the tool is coupled to the tool changer.

In addition, the tool can be seated in position in the tool mounter due to the seating guide. Therefore, reliability in a process of coupling the tool changer to the tool mounted in the tool mounter can be enhanced.

In addition, when the lever of the gripper is pressed by the pressing portion, the hook can be released from the locking recess. Accordingly, the hook can be smoothly mounted or dismounted by moving up or down the tool changer.

In addition, the adaptor having the locking recess formed thereon may be fastened to an upper side of the tool main body. Accordingly, the adaptor can be used compatibly with the tool main body which is a commercial item.

In addition, the tool mounter may include the seating portion on which the adaptor is seated, and the opening to allow the tool main body to pass therethrough. Accordingly, the tool can be stably seated in the tool mounter.

In addition, the tool mounter may further include the column portion. Accordingly, the adaptor positioned inside the column portion can be protected.

In addition, the column portion includes the guide surface which is formed to be inclined inward in the downward direction. Accordingly, the tool decoupled from the tool changer and dropping down can be seated in position on the seating portion.

The technical concept of the present disclosure has been described by way of an example, and it will be understood by those skilled in the art that various modification and changes can be made without departing from the spirit and scope of the present disclosure.

Therefore, embodiments of the present disclosure are not intended to limit the technical concept of the present disclosure, and are just to describe the present disclosure, and the scope of the technical concept of the present disclosure is not limited by the embodiments.

The right scope of the present disclosure should be interpreted based on the appended claims, and all technical concepts within the scope equivalent thereto should be interpreted as being included in the right scope of the present disclosure.

What is claimed is:

1. A tool change system comprising:
a seating portion configured to have a tool seated thereon;
a tool changer disposed on a manipulator to separate the tool from the seating portion; and
a pressing portion disposed on an upper side of the seating portion to release the tool from the tool changer,
wherein the tool changer comprises:
a main body disposed on the manipulator; and
a gripper connected to the main body and comprising a hook to be locked into a locking recess formed on the tool and a lever pressed by the pressing portion.

2. The tool change system of claim 1, wherein the tool changer further comprises a spring configured to connect the main body and the lever, and to provide an elastic force to allow the gripper to rotate in a direction of making the hook locked into the locking recess.

3. The tool change system of claim 1, wherein a plurality of the grippers are provided to be spaced apart from one another in a circumferential direction, and
wherein a plurality of the pressing portions are provided to be spaced apart from one another in the circumferential direction.

4. The toot change system of claim 1, wherein the tool changer further comprises a lower spring disposed on a bottom surface of the main body and compressed between the main body and the tool.

5. The tool change system of claim 1, wherein the tool comprises:
a tool main body; and
an adaptor fastened to an upper side of the tool main body and having the locking recess formed on an outer circumference thereof.

6. The tool change system of claim 5, wherein the tool further comprises a conducting plate disposed on a top surface of the adaptor, and
wherein the tool changer further comprises one pair of spring terminals disposed on a bottom surface of the main body and configured to apply a current when coming into contact with the conducting plate.

7. The tool change system of claim 5, wherein the tool changer further comprises a switch disposed on a bottom surface of the main body and configured to apply a current when being pressed upward by the adaptor.

8. The tool change system of claim 5, wherein the seating portion has an opening formed therein to allow the tool main body to pass therethrough.

9. The tool change system of claim 8, further comprising a column portion protruding upward from the seating portion to be connected with the pressing portion.

10. The tool change system of claim 9, wherein the column portion comprises a guide surface which is inclined inward in a downward direction.

11. The tool change system of claim 8, wherein a guide protrusion is formed on any one of a bottom surface of the adaptor and a top surface of the seating portion, and a guide recess is formed on the other one to have the guide protrusion inserted thereinto.

12. The tool change system of claim 8, wherein a magnet is provided on any one of a bottom surface of the adaptor and a top surface of the seating portion, and a magnetic substance or a sub magnet is provided on the other one to be attached to the magnet.

13. The tool change system of claim 1, further comprising a sub pressing portion disposed on a lower side of the pressing portion to press the lever upwardly,
wherein the pressing portion is configured to press the lever downwardly.

14. The tool change system of claim 13, wherein a roller is provided on at least one of the pressing portion or the sub pressing portion to come into contact with the lever.

* * * * *